United States Patent [19]

Sharp

[11] Patent Number: 5,687,770

[45] Date of Patent: Nov. 18, 1997

[54] FLOW CONTROL DEVICE

[76] Inventor: John Sharp, 10 Brighton Avenue, Brighton-Le-Sands, Australia, 2216

[21] Appl. No.: 481,359

[22] PCT Filed: Jan. 4, 1994

[86] PCT No.: PCT/AU94/00006

§ 371 Date: Sep. 15, 1995

§ 102(e) Date: Sep. 15, 1995

[87] PCT Pub. No.: WO94/16259

PCT Pub. Date: Jul. 21, 1994

[30] Foreign Application Priority Data

Jan. 4, 1993 [AU] Australia .................. PL6641

[51] Int. Cl.$^6$ ..................................... F15D 1/02
[52] U.S. Cl. ............................ 138/44; 138/37; 138/40
[58] Field of Search ..................... 138/44, 45, 37, 138/39, 40, 41; 366/336, 338, 340

[56] References Cited

U.S. PATENT DOCUMENTS

| 1,468,639 | 9/1923 | Kimmel ................ 138/44 X |
| 5,482,249 | 1/1996 | Schafbuch et al. ............ 138/44 X |

FOREIGN PATENT DOCUMENTS

| 883989 | 7/1953 | Germany .................. 138/44 |
| 23055 | 10/1955 | Germany .................. 138/46 |
| 429237 | 11/1974 | U.S.S.R. . |
| 1520489A | 7/1989 | U.S.S.R. . |
| 660144 | 10/1951 | United Kingdom . |

*Primary Examiner*—Patrick Brinson
*Attorney, Agent, or Firm*—John R. Uren

[57] ABSTRACT

A flow control device [1] for insertion into a conduit to control the flow rate of fluid flow therethrough. The device [1] includes two opposed dished baffle plates [2] and [3] defining a chamber [4] therebetween. Each baffle plate has a generally centrally located orifice [6] and [7] respectively. The device [1] is adapted for positioning substantially transverse to the longitudinal extent of the conduit by means of, for example, flanges [10 and 11] or a pre-connected threaded sleeve [15], such that fluid flow along the conduit is diverted through the orifices [6] and [7]. Additional spaced baffle plates [5] may be added on the downstream side to fine tune the flow rate.

7 Claims, 1 Drawing Sheet

1
FLOW CONTROL DEVICE

TECHNICAL FIELD

The present invention relates to a flow control device of the kind for inserting into a conduit to control the flow rate of fluid therethrough. The conduit may be a length of pipe or form part of a tap, valve or other control device.

BACKGROUND ART

Simple prior art flow control devices of this kind have included the use of substantially planar orifice plates comprising a flat plate with a central orifice. However, control devices of this kind are known to be noisy and inefficient.

It is an object of the present invention to provide a simple flow control device that overcomes or at least ameliorates one or more of the disadvantages of the prior art.

DISCLOSURE OF INVENTION

According to the invention as presently contemplated there is provided a flow control device for insertion into a conduit to control the flow rate of fluid flow therethrough, said device comprising:

two opposed generally dished baffle plates defining a generally convex chamber therebetween, each baffle plate having a generally centrally located orifice therein, said device being adapted for positioning substantially transverse to the longitudinal extent of said conduit to divert fluid flow through said spaced orifices.

Preferably the curvature of the dished baffle plates, expressed as a ratio of maximum axial depression relative to average conduit width, is approximately 1 to 5.

In a preferred embodiment, the baffle plates are approximately circular in profile, adapted to suit a conduit of similar circular cross-section.

Desirably, the ratio of the diameter of the orifice formed in each baffle plate to the average conduit width or diameter is in the range of from 0.1 to 0.4.

In a preferred form, the flow control device includes, on a downstream side, one or more additional dished baffle plates positioned in a nested configuration so as to provide a space between the orifice on the downstream side of the device and the orifice of the additional plate. These additional baffles are used to fine tune the flow rate.

Preferably, the size of the orifice provided in the downstream plate or plates is smaller than the orifice provided in the upstream plate, the orifice sizes being selected to achieve a predetermined flow rate.

In one preferred form, the baffle plates are formed with substantially planar peripheral flanges for locating the device intermediate two adjoining lengths of conduit.

In an alternate embodiment, the device is mounted on a male threaded member, in the form, for example, of an externally threaded sleeve, for insertion and location within a conduit having a complementary female threaded portion.

Preferred embodiments of the invention will now be described, by way of example only, with reference to the accompanying drawings in which:

BEST MODE FOR CARRYING OUT THE INVENTION

Figure 1:
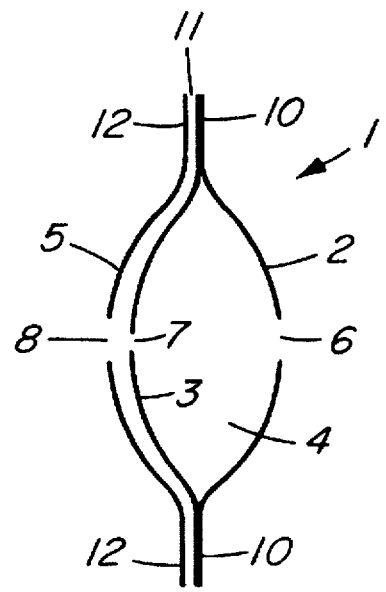
FIG. 1 is a schematic sectional view of a first embodiment of the flow control device according to the invention including planar mounting flanges.

Referring to the drawings, the device 1 comprises two opposed generally dished baffle plates 2 and 3 forming the upstream and downstream sides of the device respectively and defining a generally convex chamber 4 therebetween. An additional dished baffle plate 5 is disposed adjacent the downstream plate 3.

Each of the baffle plates 2, 3 and 5 have a generally centrally located orifice designated 6, 7 and 8 respectively. The additional baffle 5 is positioned in a nested configuration so as to provide a space between the adjacent orifices 7 and 8. These extra baffle plates are used to fine tune the flow rate.

Referring now to FIG. 1, the baffle plates 2, 3 and 5 are each provided with substantially planar peripheral flanges 10, 11 and 12 respectively, which serve to locate the device intermediate to adjoining lengths of conduit (not shown).

Figure 2:
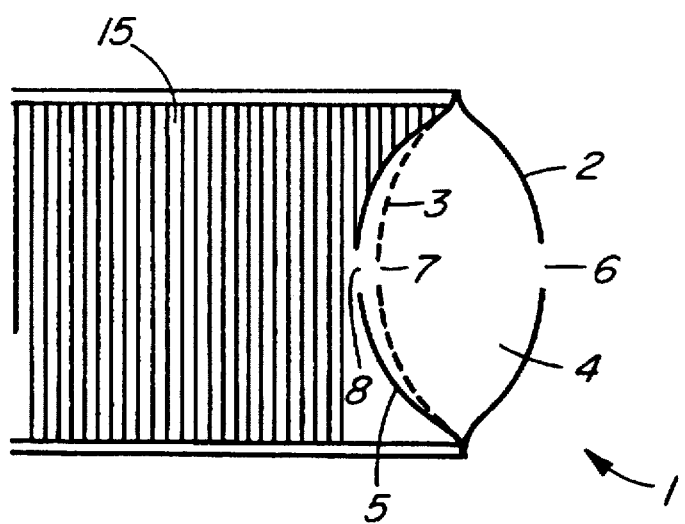
FIG. 2 is a schematic sectional view of a second embodiment according to the invention, in which the device is mounted to an externally threaded sleeve.

In an alternate embodiment illustrated in FIG. 2, the baffle plates 2, 3 and 5 are pre-assembled to an externally threaded sleeve 15, which enables insertion and location of the device within a conduit having a complementary female threaded portion.

In use, the device is positioned substantially transverse to the longitudinal extent of the conduit as shown in FIG. 1, so as to divert fluid flow along the conduit through the spaced orifices 6, 7 and 8.

The flow rate can be adjusted by selecting baffle plates with varying orifice sizes and varying the size and number of additional baffle plates 5.

A series of tests were conducted using a basic device comprising only the upstream and downstream baffle plates 2 and 3 located in a conduit or pipe having a 15 millimeter internal diameter. The orifice sizes were varied and the flow rate measured for a 300 KPa pressure reading. The results are as follows.

| Valve Size | Flow Rate Litres Per Minute |
| --- | --- |
| 6 mm/6 mm | 30 |
| 6 mm/5 mm | 24 |
| 5 mm/5 mm | 20 |
| 5 mm/4.5 mm | 18 |
| 6 mm/4.5 mm | 16 |
| 6 mm/4 mm | 15 |
| 5 mm/4 mm | 14 |
| 6 mm/3.5 mm | 11 |
| 5 mm/3.5 mm | 10.5 |
| 6 mm/3 mm | 9 |
| 4 mm/3 mm | 8 |
| 6 mm/2.5 mm | 6 |
| 5 mm/2 mm | 5 |
| 4 mm/2 mm | 4.5 |
| 6 mm/1.5 mm | 2.5 |

The device can be made from any suitable material including, for example, various sheet metals or plastics according to the intended application.

It has been found that flow control devices according to the invention are generally of an improved efficiency and quieter than the simple orifice plate style prior art devices. It is thought that these advantages of the invention arise from containing the turbulence generated by flow through the orifices within the generally convex chamber formed between the two dished baffle plates.

Although the invention has been described with reference to specific examples, it will be appreciated by those skilled in the arts that the invention can be embodied in many other forms.

I claim:

1. A flow control device for controlling the flow rate of a fluid flowing through a conduit from an upstream side of said device to a downstream side of said device, said device comprising two opposed dished baffle plates defining a chamber therebetween, each said dished baffle plate having a generally centrally located hole therein, wherein on said downstream side said device further comprises at least one additional dished baffle plate having a generally centrally located hole, said additional dished baffle plate being positioned in a nested configuration with said baffle plate of said downstream side of said device, said baffle plate of said downstream side of said device and said additional baffle plate having a space between said holes of said baffle plate of said downstream side of said device and said additional baffle plate, respectively, whereby positioning said device substantially transverse to the longitudinal extent of said conduit and diverting said fluid through said holes controls the flow rate of said fluid.

2. A flow control device according to claim 1 wherein the size of said hole provided in said dished baffle plate on said downstream side plate is smaller than said hole provided in said dished baffle plate on said upstream side and whereby positioning said device substantially transverse to the longitudinal extent of said conduit and diverting said fluid through said holes controls the flow rate of said fluid, the sizes of the upstream and downstream holes being selected to achieve a predetermined flow rate.

3. A flow control device according to claim 1 or claim 2 wherein said dished baffle plates have a maximum depression in an axial direction of said plates and the conduit has an average internal width and wherein the ratio of said maximum axial depression relative to said average internal conduit width is approximately 1 to 5.

4. A flow control device according to claim 1 or claim 2 wherein the conduit has an average internal width and said holes have an internal diameter and wherein the ratio of the diameter of said holes to said average internal width of said conduit is in the range of from 0.1 to 0.4.

5. A flow control device according to claim 1 or claim 2 wherein the baffle plates are approximately circular.

6. A flow control device according to claim 1 or claim 2 wherein said dished baffle plates are formed with substantially planar peripheral flanges for locating said device intermediate two adjoining lengths of said conduit.

7. A flow control device according to claim 1 or claim 2 wherein said conduit includes a female internally threaded portion, wherein said device is mounted on a sleeve forming a male external threaded member for insertion and location within said conduit having said complementary internal female threaded portion.

* * * * *